United States Patent [19]
Kim

[11] Patent Number: 6,036,200
[45] Date of Patent: Mar. 14, 2000

[54] ROLLING REDUCING APPARATUS FOR A VEHICLE

[75] Inventor: Jongsik Kim, Junbuk, Rep. of Korea

[73] Assignee: Hyundai Motor Company, Seoul, Rep. of Korea

[21] Appl. No.: 08/988,882

[22] Filed: Dec. 11, 1997

[30] Foreign Application Priority Data

Dec. 12, 1996 [KR] Rep. of Korea ............ 96-64615

[51] Int. Cl.[7] .................................. B60G 17/00
[52] U.S. Cl. ......................... 280/5.506; 280/6.159
[58] Field of Search ................. 280/5.508, 5.509, 280/5.514, 6.16, 6.159, 5.506; 105/199.2; 368/134

[56] References Cited

U.S. PATENT DOCUMENTS

| | | | |
|---|---|---|---|
| 1,483,814 | 2/1924 | Juruick | 368/134 |
| 2,110,809 | 3/1938 | Murphy | 280/6.16 |
| 2,338,897 | 1/1944 | Boulogne et al. | 280/5.508 |
| 2,353,503 | 7/1944 | Rost et al. | 280/5.509 |
| 2,474,471 | 6/1949 | Dolan, II | 105/199.2 |
| 2,951,455 | 9/1960 | Candlin, Jr. | 105/199.2 |
| 2,973,968 | 3/1961 | Behles | 280/6.159 |
| 3,331,616 | 7/1967 | Jackson | 280/6.159 |
| 4,050,710 | 9/1977 | Flaig | 280/6.16 |
| 5,769,400 | 6/1998 | Holzl et al. | 105/199.2 |

*Primary Examiner*—Paul N. Dickson
*Assistant Examiner*—Michael Britton
*Attorney, Agent, or Firm*—Christie, Parker & Hale, LLP

[57] ABSTRACT

A rolling reducing apparatus for a vehicle includes a suspension system for absorbing all sorts of shock generated by driving the vehicle and for supporting a vehicle chassis. The suspension system has a lower arm connecting the vehicle chassis to a wheel carrier. A centrifugal force compensator is provided for detecting centrifugal force generated by the turning of the vehicle and for compensating the centrifugal force by controlling a distance between the vehicle chassis and the lower arm in accordance with the detected centrifugal force.

3 Claims, 3 Drawing Sheets

ROLLING REDUCING APPARATUS FOR A VEHICLE

FIELD OF THE INVENTION

The present invention relates to a rolling reducing apparatus for a vehicle, and in particular, to a rolling reducing apparatus having an air suspension system, which is able to reduce rolling and tilting caused by centrifugal force generated by turning the vehicle.

BACKGROUND OF THE INVENTION

Generally, most vehicles have various kinds of suspension systems. The suspension system absorbs all sorts of shock generated when the vehicle is driving to improve stability of the vehicle and ride comfort. One type of such suspension system is an air suspension system using an air spring.

The air suspension system is able not only to absorb shock but also to uniformly maintain vehicle height regardless of a change in the vehicle weight. The air suspension system is also able to absorb high frequency vibrations as well. Further, the elastic modulus of the air spring is automatically regulated by the change in compressed air in the air spring in accordance with the weight change.

The air suspension system generally has a leveling valve for balancing the left and right height of the vehicle. For example, when the vehicle is turning, the vehicle receives centrifugal force which tilts the vehicle outward. Accordingly, the air suspension system changes a relative distance between a lower arm connecting the vehicle chassis to the wheel carrier supporting the wheel and the vehicle chassis. Namely, from an outward wheel view, the vehicle tilts outward such that the chassis gets near the lower arm. Here, a link assembly connected to a lever for actuating the leveling valve detects this distance change and the leveling valve opens to supply compressed air from an air tank to an air spring. Thus, the air spring mounted on the outward wheel side swells to uniformly maintain the distance between the chassis and the lower arm. Consequently, the vehicle keeps balanced.

As described above, a conventional air suspension system keeps a vehicle body balanced. However, when the vehicle is turning, passengers in the vehicle experience a centrifugal force which causes the bodies of the passengers to tilt outward. Such tilting causes discomfort to the passengers. Further, in the case of a truck, if loaded goods on the truck tilt outward by the centrifugal force, the vehicle could roll over due to the centrifugal force acting on the goods.

SUMMARY OF THE INVENTION

The present invention has been made in an effort to solve the above problems.

It is an object of the present invention to provide a rolling reducing apparatus for a vehicle which can compensate for centrifugal force generated by turning the vehicle to lift the outward side of the chassis of the vehicle body.

To achieve the above object, an embodiment of the present invention provides a rolling reducing apparatus for a vehicle having a suspension means for absorbing shock generated by driving the vehicle and supporting a vehicle chassis. The suspension means includes a lower arm connecting the vehicle chassis to a wheel carrier. A centrifugal force compensating means detects centrifugal force generated by turning the vehicle and compensates for the centrifugal force by controlling the distance between the vehicle chassis and the lower arm in accordance with the detected centrifugal force.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

Figure 1:
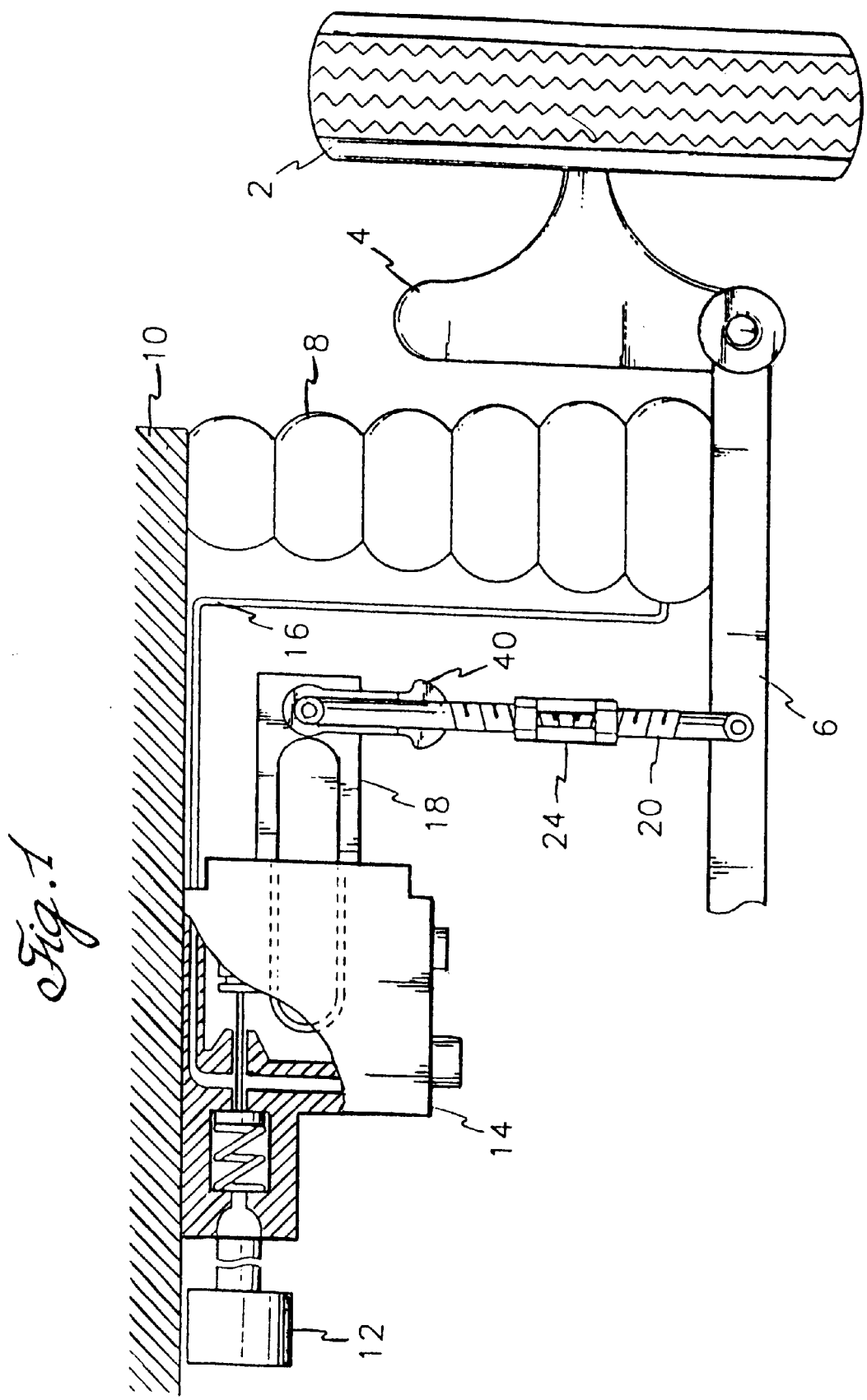
FIG. 1 is a schematic diagram showing a centrifugal force compensating suspension system in accordance with a preferred embodiment of the present invention.

In the drawings, in order to assist the explanation regarding the present invention, each element is exaggerated compared with its real size.

DETAILED DESCRIPTION OF PREFERRED EMBODIMENTS

In the following detailed description, only the preferred embodiment of the invention has been shown and described, simply by way of illustration of the best mode contemplated by the inventor of carrying out the invention. As will be realized, the invention is capable of modification in various other respects, all without departing from the invention. Accordingly, the drawing and description are to be regarded as illustrative in nature, and not as restrictive.

Referring first to FIG. 1, a rolling reducing apparatus is mounted on the right front wheel portion when viewed from behind. For ease of explanation, many parts mounted between the vehicle chassis and the wheel which do not relate to the described embodiment are omitted. Further, all structural elements of the described embodiment of the present invention are illustrated in one plane in the drawing. In other words, although the mounting location of the structural elements are multi-dimensional and may be changed by the skilled artisan, in order to facilitate the explanation, all the structural elements are illustrated in one plane.

For explanatory purposes, if the vehicle turns to the left, the wheel 2 becomes the outward wheel. The wheel 2 is rotatably supported by a wheel carrier 4, on a lower end of which a lower arm 6 is pivotally mounted. Of course, between the wheel 2 and the lower arm 6, a plurality of devices are mounted, however the devices are not illustrated to avoid complicating the drawing.

A shock absorber, such as an air spring 8, is disposed between the lower arm 6 and a vehicle chassis 10 and is supplied with compressed air from an air tank 12. The compressed air from the air tank 12 is generated by a compressor (not shown).

The compressed air supplied to the air spring 8 through a passage 16 is controlled by a leveling valve 14. A surge tank (not shown) may be mounted on the passage 16 which minimizes changes in the pressure level of the compressed air. Further, it is possible to provide a safety valve (not shown) in the air spring 8 for preventing pressure levels from excessively increasing.

The leveling valve 14 has a lever 18 for opening and closing the same. The lever 18 is connected to the lower arm 6 by a link 20 which is pivotally connected the lower arm 6. If the lower arm 6 nears the vehicle chassis 10, the lever 18 moves upward such that the leveling valve 14 opens. If the lever 18 excessively moves downward, an exhaust port (not shown) mounted on a lower portion of the leveling valve 14 opens to exhaust compressed air to the outside. Because the operation of the exhaust port is identical to the prior art, a detailed illustration and description thereof will be omitted.

Figure 2:
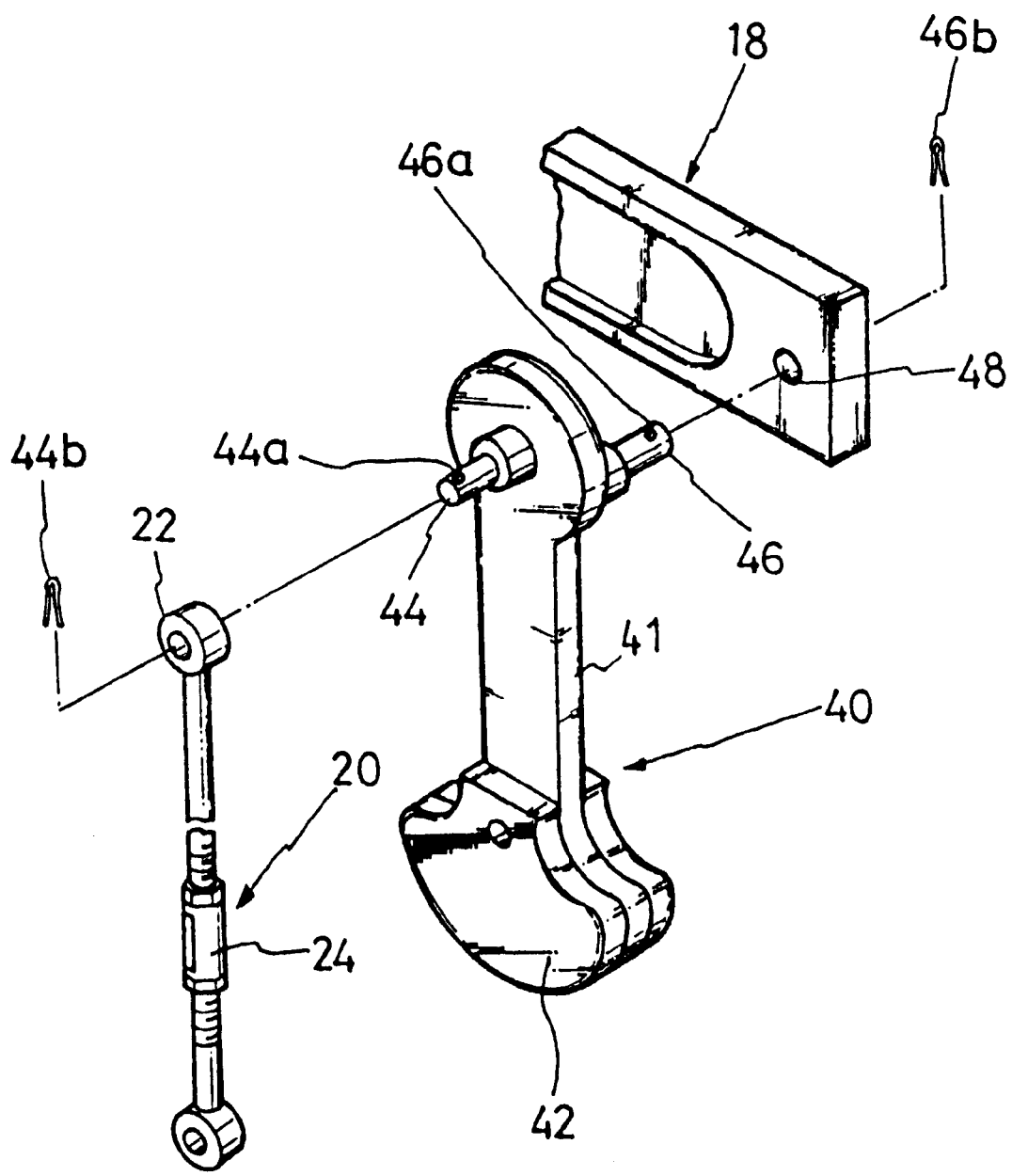
FIG. 2 is an exploded perspective view showing a crank member assembly of FIG. 1.

Between the link 20 and the lever 18 is provided a centrifugal force compensator such as a crank member assembly 40 including a crank body 41 (see FIG. 2). FIG. 2 shows an exploded perspective view of the mounting structure of the crank member assembly 40.

In order to accurately detect centrifugal force, a weight fly 42 is attached to a lower portion of the crank body 41. On one side of an upper portion of the crank body 41 is formed a first eccentric protrusion 44 which is inserted into a conjunction hole 22 formed on an upper portion of the link 20. Further, on the first eccentric protrusion 44 is formed a fixing hole 44a for a cotter pin 44b.

On the reverse side of the first eccentric protrusion 44 is formed a second eccentric protrusion 46 which is eccentrically located below the first eccentric protrusion 44. The second eccentric protrusion 46 is inserted into another conjunction hole 48 formed on an end portion of the lever 18. Also, on the second eccentric protrusion 46 is formed another fixing hole 46a for a cotter pin 46b. On the middle portion of the link 20 is provided a turnbuckle 24 for adjusting the length of the link 20.

The operating process of the described embodiment of the air suspension system will be described hereinbelow.

When the vehicle is parked the leveling valve 14 is not operating. When the vehicle bounces and rebounds while being driven in a straight line, the leveling valve 14 is similarly not operated since there is a predetermined clearance between the lever 18 and the leveling valve 14.

Figure 3:
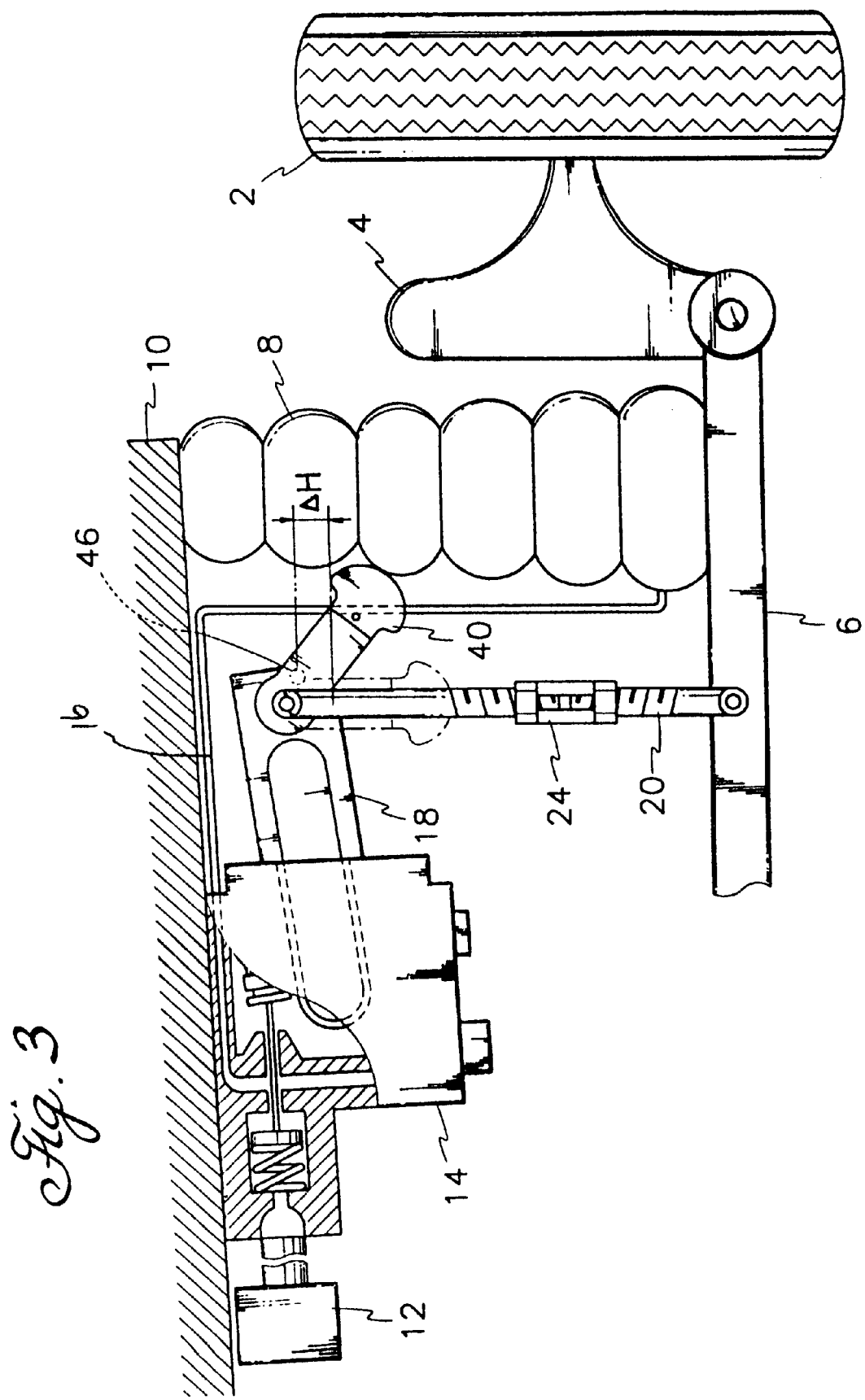
FIG. 3 is a schematic diagram showing the centrifugal force compensating suspension system of FIG. 1, in operation.

However, if the vehicle turns left, it undergoes a centrifugal force, as illustrated in FIG. 3, which causes the leveling valve 14 to operate with the crank member assembly 40.

The centrifugal force generated by the vehicle turning left causes the vehicle body to tilt to the right. Thus, the vehicle chassis 10 comes near the lower arm 6 supporting the wheel 2. Under the present condition, the link 20 disposed between the lower arm 6 and the chassis 10 pushes the lever 18 upward. Accordingly, the leveling valve 14 opens to supply compressed air to the air spring 8 from the air tank 12 such that the air spring 8 swells. This causes the distance between the chassis 10 and the lower arm 6 to be uniformly maintained to prevent tilting of the vehicle to the right by the centrifugal force.

However, despite this balance function, passengers in the vehicle continuously experience a centrifugal force which causes them to tilt outward. By the same reason, the crank member assembly 40 tilts to the right, namely outward. The crank member assembly 40 is displaced as illustrated in FIG. 3, and a relative position between the first and second eccentric protrusion 44 and 46 on the upper portion of the crank body 41 is changed. In other words, the second eccentric protrusion 46 below the first eccentric protrusion 44 is moved to a higher point to push the lever 18 upwards by Δ H.

This causes the leveling valve 14 to open to a greater degree to supply more compressed air to the air spring 8. Namely, the right side chassis 10 of the vehicle is lifted higher than a horizontal level. Consequently, the passengers in the vehicle receive a tilting force which gives them a tilt to the left which offsets the centrifugal force.

In the above description, when the vehicle is turning to the left, a right wheel portion is described. Of course, when the vehicle is turning to the right, a left side suspension system is operated to tilt the vehicle to the right.

In the vehicle suspension system of a preferred embodiment of the present invention, although the vehicle is turning, passengers in the vehicle do not experience the centrifugal force which causes them to tilt outward, thereby improving ride comfort. Further, in the case of a truck, an accident can be prevented by causing the loaded goods on the truck to tilt outward.

Although preferred embodiments of the present invention have been described in detail hereinabove, it should be clearly understood that many variations and/or modifications of the basic inventive concepts herein taught which may appear to those skilled in the art will still fall within the spirit and scope of the present invention, as defined in the appended claims.

What is claimed is:

1. A rolling reducing apparatus for a vehicle, comprising:
   suspension means for absorbing shock generated by driving the vehicle and for supporting a vehicle chassis, said suspension means comprising a lower arm connecting the vehicle chassis to a wheel carrier, and a link assembly for detecting a decrease in a distance between the lower arm and the vehicle chassis;
   centrifugal force compensating means for detecting centrifugal force generated by turning the vehicle and compensating for the centrifugal force by increasing the distance between the vehicle chassis and the lower arm beyond the decrease in the distance detected by the link assembly;
   wherein said suspension means further comprises an air spring, disposed between the vehicle chassis and the lower arm, for supporting the vehicle chassis, a compressed air source for compressing air, and a leveling valve for selectively supplying air compressed by the air source to the air spring to cause the increase in the distance between the lower arm and the vehicle chassis; and
   wherein said centrifugal force compensating means comprises a crank member assembly disposed between the link assembly and the leveling valve, said crank member assembly comprising a crank body, a weight fly attached to a lower portion of the crank body, a first eccentric protrusion formed on one side of an upper portion of the crank body, said first eccentric protrusion being pivotably connected to the link assembly, and a second eccentric protrusion formed on the other side of the upper portion of the crank body, the second eccentric protrusion located below the first eccentric protrusion and pivotably connected to the leveling valve, wherein said crank member controls the leveling valve to supply air compressed by the air source to the air spring by a pivot motion of the weight fly.

2. A suspension system for a vehicle, comprising:
   a lateral arm for laterally connecting a wheel carrier supporting a wheel to a vehicle chassis;
   a shock absorber for absorbing shock transmitted from the wheel, said shock absorber comprising an air spring and being vertically disposed between said lateral arm and said vehicle chassis; and
   a centrifugal force compensator, disposed between said lateral arm and said vehicle chassis, for forcing said shock absorber to operate against vehicle load caused by centrifugal force when the vehicle turns such that an outward side of the vehicle chassis is lifted higher than an inward side of the vehicle chassis;

an air source for compressing air;

a link assembly disposed on said lateral arm;

a leveling valve for selectively supplying air compressed by the air source to said air spring in accordance with vertical movement of said link assembly; and wherein said centrifugal force compensator comprises a crank member disposed between said link assembly and said leveling valve, said crank member being pivotable about a central axis of an upper portion thereof, and means for increasing an opening of the leveling valve when said crank member is pivoted toward the wheel by centrifugal force generated by turning the vehicle, thereby supplying increased compressed air to said air spring to lift the vehicle chassis against the vehicle load applied by the centrifugal force, said increasing means comprising a first protrusion formed on one side of the upper portion of the crank member and pivotally connected to the link assembly, and a second protrusion formed on the other side of the upper portion of the crank member and pivotally connected to the leveling valve, said second protrusion being disposed below the first protrusion.

3. A suspension system of claim 2 wherein said centrifugal force compensator further comprises a weight fly attached to a lower portion of the crank member.

* * * * *